United States Patent [19]

Takeda

[11] Patent Number: 5,784,520
[45] Date of Patent: Jul. 21, 1998

[54] AUDIO SIGNAL REPRODUCING APPARATUS

[75] Inventor: Takayuki Takeda, Kanagawa, Japan

[73] Assignee: Sony Corporation, Tokyo, Japan

[21] Appl. No.: 882,755

[22] Filed: Jun. 26, 1997

Related U.S. Application Data

[63] Continuation of Ser. No. 331,655, filed as PCT/JP94/00361 Mar. 7, 1994 published as WO94/21082 Sep. 15, 1994, abandoned.

[30] Foreign Application Priority Data

Mar. 10, 1993 [JP] Japan ................................ 5-049267

[51] Int. Cl.⁶ .................................................. H04N 5/783
[52] U.S. Cl. ........................... 386/69; 386/104; 386/124
[58] Field of Search ................................ 386/39, 13, 50,
386/96, 81, 98, 97, 99, 101, 102, 104–105,
106–107; 360/20, 21, 18, 48, 32, 39, 73.04,
73.05, 73.08

[56] References Cited

U.S. PATENT DOCUMENTS

| 4,742,519 | 5/1988 | Abe et al. | 386/50 |
|---|---|---|---|
| 4,772,959 | 9/1988 | Amano et al. | 360/8 |
| 5,043,830 | 8/1991 | Chiba Nobuhiro | 386/100 |
| 5,140,473 | 8/1992 | Murakami | 360/19.1 |
| 5,159,452 | 10/1992 | Kinoshita et al. | 358/141 |
| 5,239,430 | 8/1993 | Koishikawa et al. | 360/77.13 |
| 5,400,186 | 3/1995 | Inoue et al. | 360/32 |
| 5,434,673 | 7/1995 | Inoue et al. | 358/335 |
| 5,459,621 | 10/1995 | Tsuji et al. | 360/32 |
| 5,473,478 | 12/1995 | Nakashika | 386/102 |
| 5,479,264 | 12/1995 | Ueda et al. | 358/335 |

FOREIGN PATENT DOCUMENTS

| 0 182 465 | 5/1986 | European Pat. Off. . |
| 0 315 372 | 5/1989 | European Pat. Off. . |
| 0 493 129 | 7/1992 | European Pat. Off. . |
| 0 506 294 | 9/1992 | European Pat. Off. . |
| 0 579 514 | 1/1994 | European Pat. Off. . |
| 62-66470 | 3/1987 | Japan . |
| 3-244288 | 10/1991 | Japan . |

*Primary Examiner*—Andrew Faile
*Assistant Examiner*—Aung S. Moe
*Attorney, Agent, or Firm*—Frommer Lawrence & Haug LLP; William S. Frommer

[57] ABSTRACT

A de-shuffling circuit of a first audio processor 21 performs the following signal processing. When an audio signal is to be reproduced from a video tape 1 in which an audio signal having 4004 samples in consecutive 5 fields is recorded on a helical track, with the number of effective samples for one field equal to 800 or 801, all samples of at least one reproduction among audio signals produced by two or more reproductions of an image signal of the same field are outputted and samples of other reproductions are adaptively controlled in a variable speed reproduction mode for reproducing an arbitrary field twice or more with a dynamic tracking head 2A. Thus, the total number of samples for the 5 fields is limited to not more than 4004.

7 Claims, 8 Drawing Sheets

AUDIO SIGNAL REPRODUCING APPARATUS

This application is a continuation of application Ser. No. 08/331,655, filed as PCT/JP94/00361, Mar. 7, 1994, published as WO94/21082, Sep. 15, 1994, now abandoned.

TECHNICAL FIELD

This invention relates to an audio signal reproducing apparatus for reproducing audio signals from a recording medium in which an audio signal having M samples aliquant with N is recorded along with every image signal of consecutive N fields, M and N representing natural numbers. The reproducing apparatus is adapted for a composite digital D-2 format video tape recorder (VTR).

BACKGROUND ART

Conventionally, the digital VTR converts video signals and audio signals into corresponding digital data and records the resulting video data and audio data on a helical track of a magnetic tape with a rotary head.

Figure 1:
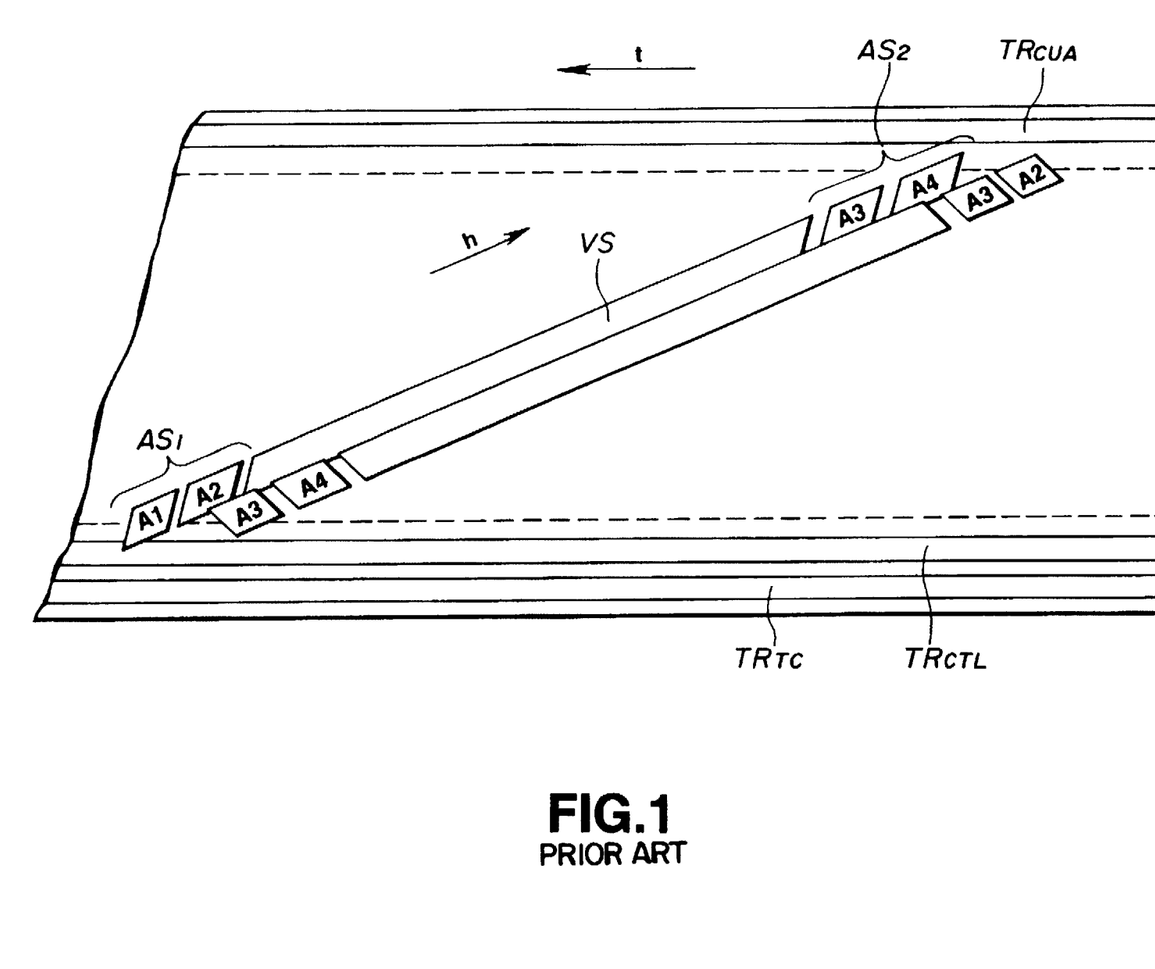
FIG. 1 is a view showing a track format of a digital D-2 format VTR.

With the digital D-2 format VTR, three longitudinal tracks, that is, a time code track $TR_{TC}$ having a time code recorded therein, a control track $TR_{CTL}$ having a control signal for providing a servo reference recorded therein and a cue audio track $TR_{CUA}$ having an editing cue audio signal recorded therein, and a helical track $TR_{PRG}$ called program track having a video data and audio data recorded therein are specified, as shown in FIG. 1. One helical track $TR_{PRG}$ is composed of a central video sector VS and audio signal sectors $AS_1$, $AS_2$ before and after the video sector VS.

The digital D-2 format VTR records video data in which one field consists of 3 segments/6 tracks, along with audio data, on a magnetic tape with two pairs of recording rotary magnetic heads provided to face each other with an angle of 180° in a rotary drum. The digital D-2 format VTR also reproduces the video data and the audio data recorded on the magnetic tape, with two pairs of reproducing magnetic heads provided to face each other with an angle of 180° in the rotary drum.

In a so-called helical scan type video tape recorder for recording/reproducing image signals via helical tracks on the magnetic tape, dynamic tracking control is performed by a head shifting device using an electrical/mechanical converting element such as a bimorph for shifting the reproducing rotary magnetic head to traverse the helical tracks on the magnetic tape in variable reproduction, in response to the demand for accurately scanning the helical tracks with the reproducing rotary magnetic head. The reproducing rotary magnetic head shifted by the head shifting device is referred to as a dynamic tracking head or DT head.

The digital D-2 format VTR is so designed that the number of samples is allocated to the audio sectors of each helical track to have a total of 4004 samples for 5 fields, in accordance with the number of helical tracks, the number of audio channels and the number of sectors of one field.

Stated differently, the sampling frequency of the audio signal is 48 kHz in the digital VTR. Therefore, in the NTSC system (525/60 system), the number of recordable samples corresponding to one field of the video signal is 800.8, which is not an integer. The number of samples can only become an integer for several fields, for example, 4004 samples for 5 fields in the present case. Thus, 4004 samples for 5 fields of the video signal is used as a recording unit of the audio data, with the number of samples allocated to the audio

2 sectors in one field in a manner of 800, 801, 801, 801, 801, 800, 801, .... With AUX data included, the data of one field has 810 samples.

Therefore, information indicating the number of samples allocated to each audio sector in 5 fields and recording sequence information indicating completion of data for 5 fields are required for reproducing the audio data.

The digital VTR records the recording sequence information in the data on a helical track for one of the 5 fields, so that the recording sequence information can be detected as one pulse in the 5 fields in reproduction.

The digital VTR of the NTSC system has a counter which self-counts 4004 samples in order to maintain the 5-field sequence.

It is now assumed that variable speed reproduction for reproducing an arbitrary field twice or more, for example, variable speed reproduction with a reproduction speed lower than the normal speed, is performed in the digital VTR. In this case, when the track having 801 samples is traced five times, the total number of samples for 5 fields is 4005. In order to maintain the above-described 5-field sequence, the last one sample of the present 5-field sequence is to be deleted. However, if the last sample to be deleted includes significant information required for variable speed reproduction of the audio signal, the deletion of the last sample greatly affects the reproduction sound of the variable speed reproduction with a reproduction speed lower than the normal speed.

The above drawback is generated in the NTSC system, but is not generated when the PAL system is employed. In the PAL system, as the number of samples of one field including the AUX data is 972 samples (words), the number of effective samples is constantly 960 and hence the number of samples of the 5-field sequence remains constant.

It is therefore an object of the present invention to provide a digital VTR which has a variable speed reproducing function and which is capable of producing reproduction sounds without being adversely affected by the variable speed reproduction with a reproduction speed lower than the normal reproduction speed.

DISCLOSURE OF THE INVENTION

According to the present invention, there is provided a reproducing apparatus for reproducing audio signals from a recording medium in which an audio signal having M samples aliquant with N for an image signal for consecutive N fields, M and N representing natural numbers. In this reproducing apparatus, a signal processing unit outputs all samples of at least one reproduction among audio signals produced by reproducing the image signal of the same field twice or more in a variable speed reproduction mode for reproducing an arbitrary field twice or more, and adaptively controls samples of other reproduction. Thus, the signal processing unit performs signal processing to make the total number of samples for the N fields equal to or smaller than M.

In the digital VTR having the variable speed reproduction function according to the present invention, all the effective samples of at least one reproduction among two or more reproductions of the arbitrary field are outputted in the variable speed reproduction for reproducing the arbitrary field twice or more, that is, the variable speed reproduction at a reproduction speed lower than the normal speed. Thus, the adverse effect of deleting the effective sample can be avoided. Also, by adaptively controlling the number of samples in the remaining reproduction, that is, by adaptively deleting the samples within the same reproduced field, the total number of samples for N fields in the variable speed reproduction can be prevented from exceeding M.

In the audio signal reproducing apparatus according to the present invention, the signal processing unit outputs all the samples of the first reproduction among audio signals produced by reproducing the same field twice or more in the variable speed reproduction mode, and adaptively outputs samples of the second and subsequent reproductions. Thus, the signal processing unit permits the total number of samples for the N fields to be equal to or smaller than M. The signal processing unit outputs all the samples of the first reproduction among the audio signals produced by reproducing the same field twice or more in the variable speed reproduction, and outputs remaining samples at least except one sample of the second and subsequent reproductions. Thus, the signal processing unit permits the total number of samples for N fields to be equal to or smaller than M. In addition, the signal processing unit has a storage unit for transiently storing the audio signals, and controls reading of the audio signals from the storage unit to control the number of samples to be outputted. Thus, the signal processing unit permits the total number of samples for N fields to be equal to or smaller than M.

In the reproducing apparatus according to the present invention for reproducing audio signals from a recording medium in which audio signals shuffled in an N-field sequence are recorded, the signal processing unit controls reading of the audio signals from a storage unit in a de-shuffling unit for deshuffling the audio signals, to control the number of samples to be outputted. The signal processing unit permits the number of samples for N fields to be equal to or smaller than M.

In the audio signal reproducing apparatus according to the present invention, a flag output unit detects the total number of samples of the audio signals read out from the storage unit and outputs an error flag when the total number of samples is less than M. A conceal unit produces deficit samples to form the total number M by interpolating the audio signals read out from the storage unit, in response to the error flag.

In the audio signal reproducing apparatus according to the present invention, the reproducing unit moves a dynamic tracking head for reproducing signals from a tape-shaped recording medium, in a direction vertical to tracks of the tape-shaped recording medium, and has a servo unit for outputting a jump signal indicating a control state. The signal processing unit controls the number of samples of the audio signals read out from the storage unit in response to the jump signal. Thus, the signal processing unit permits the number of samples for N fields to be equal to or smaller than M.

In the audio signal reproducing apparatus according to the present invention, the variable speed reproduction sound with a reproduction speed lower than the normal speed can be transmitted to a subsequent process block for generating the variable speed reproduction sound, while the N-field sequence of the shuffled data is maintained with all the effective data samples maintained. Thus, the reproduction sound can be produced without being adversely affected by the variable speed reproduction with a reproduction speed lower than the normal speed.

For instance, with the digital VTR adaptable to the NTSC system, it is now assumed that the so-called dynamic tracking head provided in the rotary head drum of the VTR traces the same track in the variable speed reproduction at a reproduction speed lower than the normal speed so that the dynamic tracking head can follow the helical track on the tape and so that the reproduction image is not turbulent. In this case, even though the signal recorded on the track has 801 samples in one field, the number of samples is reduced to 800 so that the number of samples of the 5-field sequence does not exceed 4004. When the number of samples for 5 fields is less than 4004 samples, a predetermined error flag for the deficit samples is generated for performing the conceal processing on the subsequent stage based upon the error flag.

BEST MODE FOR CARRYING OUT THE INVENTION

A preferred embodiment of the audio signal reproducing apparatus according to the present invention will now be described in detail with reference to the accompanying drawings.

Figure 2:
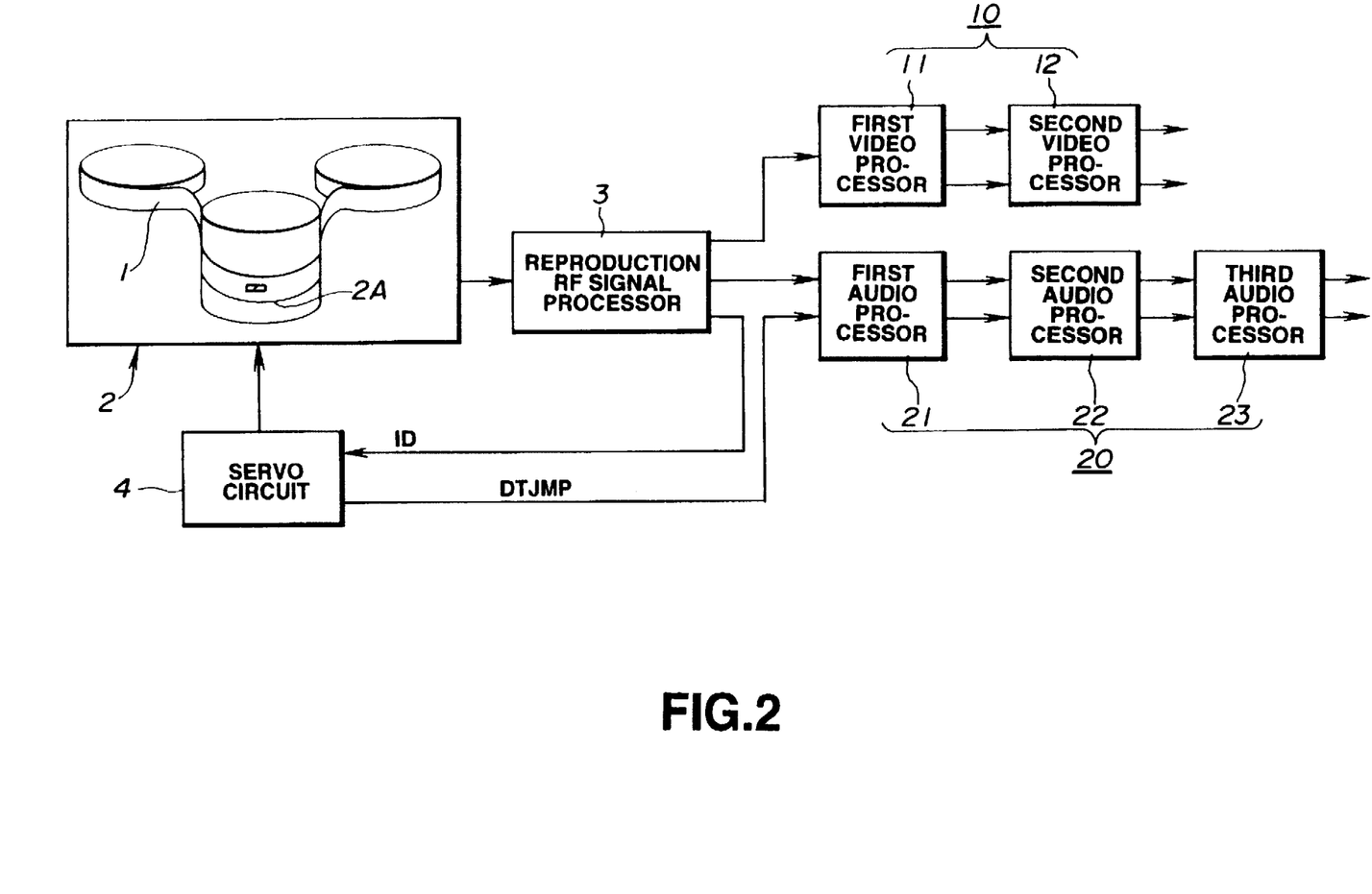
FIG. 2 is a block circuit diagram showing the structure of a reproducing system of a digital VTR according to the present invention.

In the reproducing apparatus of the present embodiment, the present invention is adapted to a reproducing system of the digital VTR adaptable to the NTSC system for reproducing audio signals from a video tape 1 in which audio signals are recorded on helical tracks, with the number of effective samples for one field equal to 800 or 801 samples (words) and the number of samples for 5 consecutive fields equal to 4004. The reproducing apparatus has a reproducing section 2 for generating a reproduction RF signal from the helical track of the video tape 1, a reproduction RF signal processor 3 provided with the reproduction RF signal from the reproducing section 2, and a video data processing system 10 and an audio processing system 20 which are provided with RF data from the reproduction RF signal processor 3.

The reproducing section 2 has a dynamic tracking head 2A for scanning the helical track of the video tape 1, and is operative in a variable speed reproduction mode for reproducing an arbitrary field twice or more. The reproducing section 2 has the dynamic tracking head 2A and a capstan of a tape running system controlled by a servo circuit 4. The reproducing section 2 supplies to the reproduction RF signal processor 3 the reproduction RF signal produced by scanning the helical track of the video tape 1 with the dynamic tracking head 2A.

The reproduction RF signal processor 3 converts the reproduction RF signal produced by the reproducing section 2 into a binary signal, corrects errors of the binary signal with an inner check code to produce RF data and supplies the resulting RF data to the video data processing system 10 and to the audio processing system 20. The reproduction RF signal processing section 3 also separates track identification (ID) data from the RF data and supplies the track ID data to the servo circuit 4.

The servo circuit 4 performs tracking control by shifting the dynamic tracking head 2A of the reproducing section 2 in a direction vertical to the helical track of the video tape 1, that is, in the direction of track width. In the variable speed reproduction mode, the servo circuit 4 controls the track jump of the dynamic tracking head 2A. When the same field is repeatedly reproduced twice or more, the servo circuit 4 supplies a jump signal DTJMP indicating the field of the second and subsequent reproductions to a first audio processor 21 of the audio processing system 20.

The operation mode of the servo circuit 4 is automatically switched by speed data provided by a system controller, not shown.

In the video processing system 10, a first video processor 11 collects and arranges video data from the RF data supplied from the reproduction RF signal processor 3 and then treats the video data with error correction, de-shuffling and error adjustment. A second video processor 12 expands the resulting video data for the inverse processing of the compression in the recording system, for example, through inverse discrete cosine transform as the inverse processing of discrete cosine transform.

In the audio processing system 20, the first audio processor 21 collects and arranges audio data from the RF data supplied from the reproduction RF signal processor 3 and then treats the audio data with error correction, de-shuffling and error adjustment. A second audio processor 22 interpolates the resulting audio data in response to the reproduction speed with, for example, Lagrange's interpolation, and then a third audio processor 23 controls the gain of the audio data.

Figure 3:
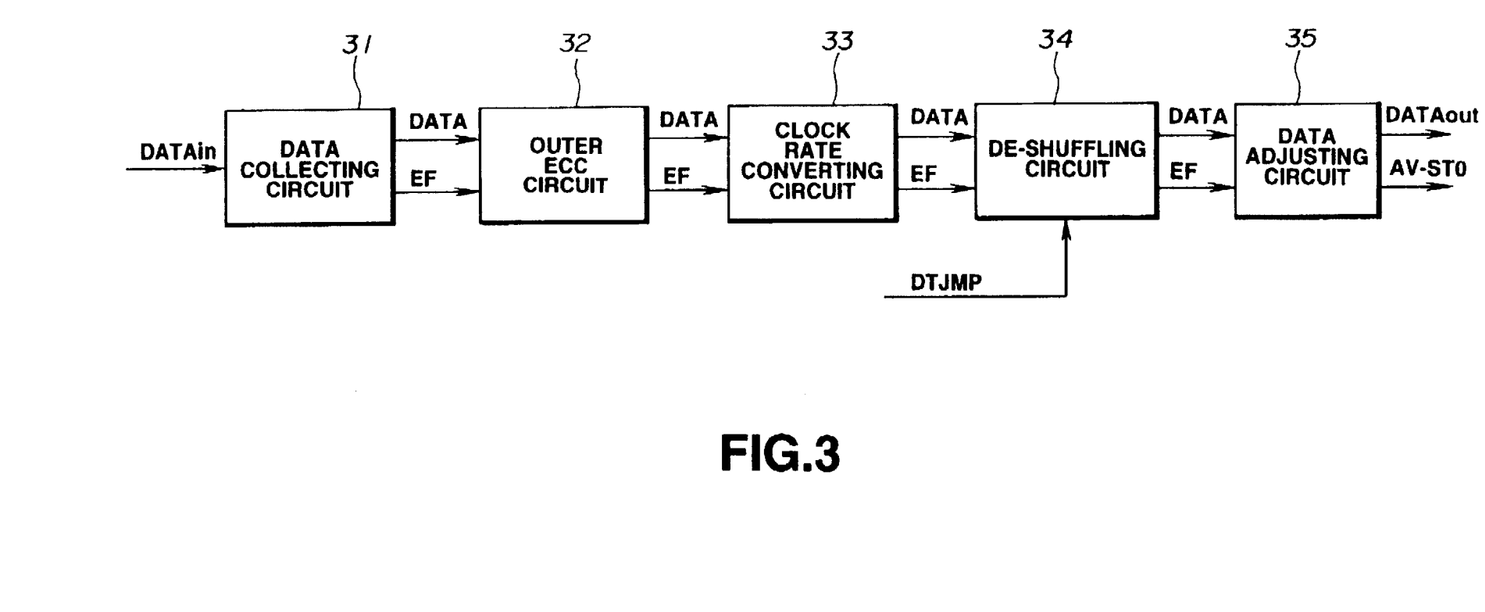
FIG. 3 is a block circuit diagram showing a specific example of the structure of the first audio processor in the reproducing system.

FIG. 3 shows a specific example of the structure of the first audio processor 21.

The first audio processor 21 has a data collecting circuit 31, an outer error correction code (ECC) circuit 32, a clock rate converting circuit 33, a de-shuffling circuit 34 and a data adjusting circuit 35.

In the first audio processor 21, the data collecting circuit 31 collects and arranges the audio data from the RF data, which has the video data and the audio data multiplexed therein and which is supplied from the reproduction RF signal processor 3. The outer ECC circuit 32 corrects errors of the audio data supplied from the data collecting circuit 31, with the outer check code. The clock rate converting circuit 33 converts the clock rate of the error corrected audio data from the video-based clock rate to the audio-based clock rate.

The de-shuffling circuit 34 de-shuffles the audio data synchronously with an audio-based reference clock (FS 256=48 kHz×256).

Figure 4:
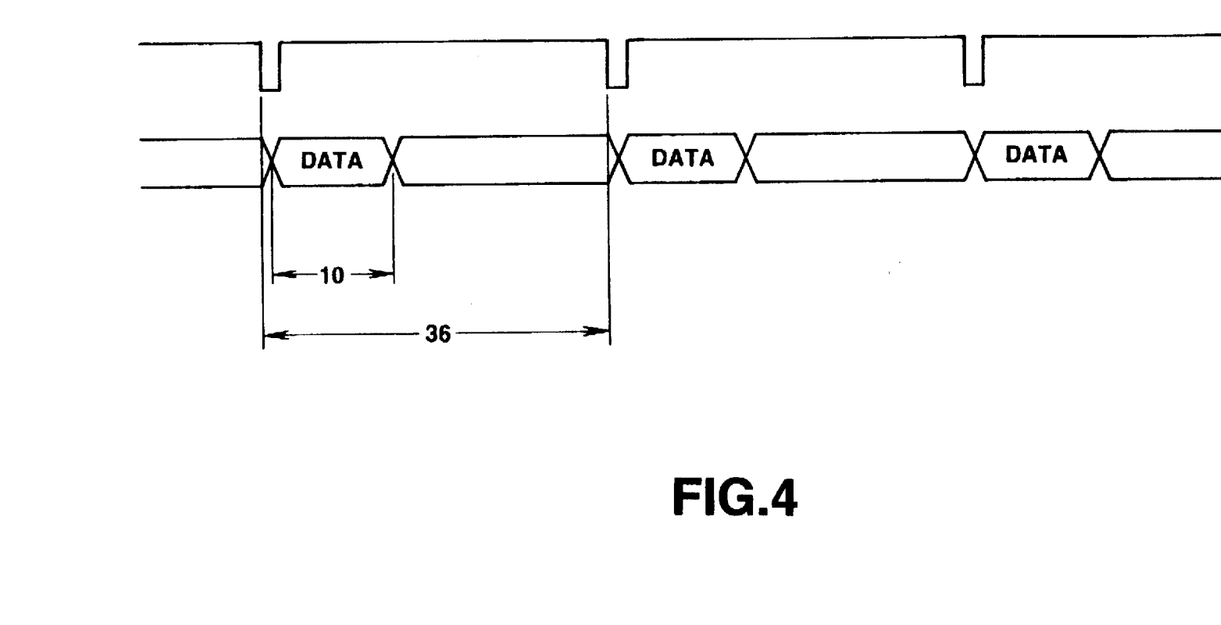
FIG. 4 is a timing chart showing the timing for storing audio data in a memory in the first audio processor.

In the operation of the de-shuffling circuit 34, data only for 10 clocks (FS 128=48 kHz×128) from the ASYNC signal indicating the initial part of the data on the ECC block basis in the outer ECC circuit 32 are effective, as shown in FIG. 4. The effective data is stored in a memory.

Figure 5:
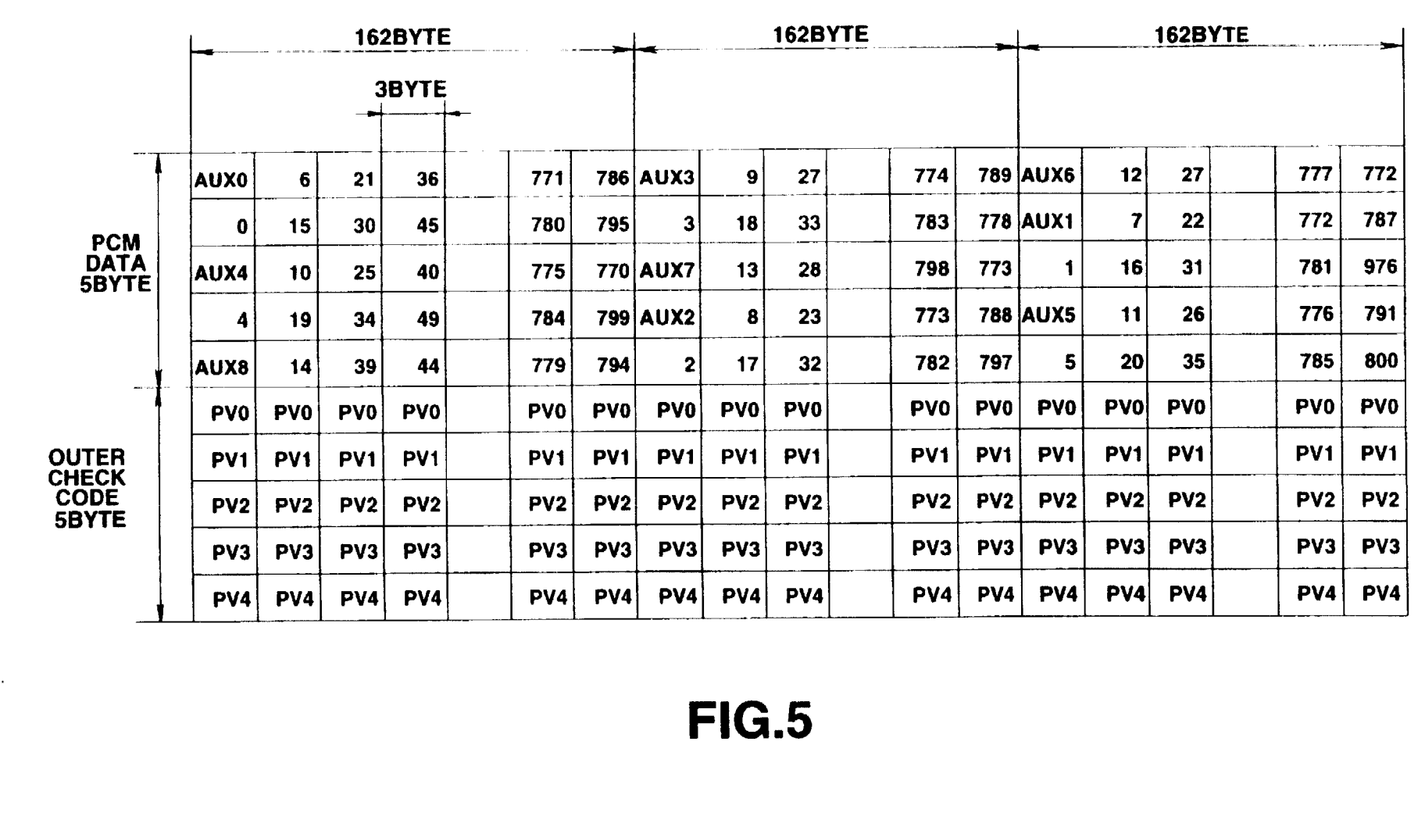
FIG. 5 is a view showing an arrangement state of the audio data in an ECC block.

At this point, the data from the initial part of the ECC block as shown in FIG. 5, that is, from the first ASYNC signal, is in the sequence of AUX0, 0, AUX4, 4, AUX8, PV0, PV1, PV2, PV3 and PV4. The data from the next ASYNC signal is advanced by 162 bytes, to have the sequence of AUX3, 3, AUX7, AUX2, 2, PV0, PV1, PV2, PV3 and PV4. In addition, the data from the subsequent ASYNC signal is in the sequence of AUX6, AUX1, 1, AUX5, 5, PV0, PV1, PV2, PV3 and PV4. The data reverts to the initial part of the first ECC block, to have the sequence of AUX0, 0, AUX4, 4, AUX8, PV0, PV1, PV2, PV3 and PV4.

PV0 to PV4 are outer check codes for error correction, which are no longer necessary for the above data. One box of data consists of 24 bits. For instance, AUX0 is composed of 3 bytes, with 1 byte consisting of 8 bits. Data for each byte is transmitted with one ASYNC signal. Therefore, AUX0 or data 0 is determined after at least 7 ASYNC signals are entered. As the data need to be rearranged into 1, 2, 3, 4, . . . by de-shuffling to produce the original data, at least two columns of ECC block based data must be entered. However, de-shuffling is started at the earliest possible timing, specifically, 32×48 kHz later, so as to reduce the used capacity of the memory. Thus, the delay quantity of the data in the de-shuffling block is limited to an extremely low level of about 32×20 μsec=640 μsec.

The data adjusting circuit 35 adjusts errors of audio data which has been de-shuffled by the de-shuffling circuit 34 and in which an error flag is raised.

To prevent an overflow of the de-shuffling in variable speed reproduction with a reproduction speed lower than the normal speed for reproducing the same field twice or more, the de-shuffling circuit 34 takes out all the effective samples of at least one reproduction of the two or more reproductions, and adaptively deletes the samples of the remaining reproduction of the same field. Thus, the de-shuffling circuit 34 performs such signal processing that the total number of samples for 5 fields in the variable speed reproduction is not greater than 4004.

Figure 6:
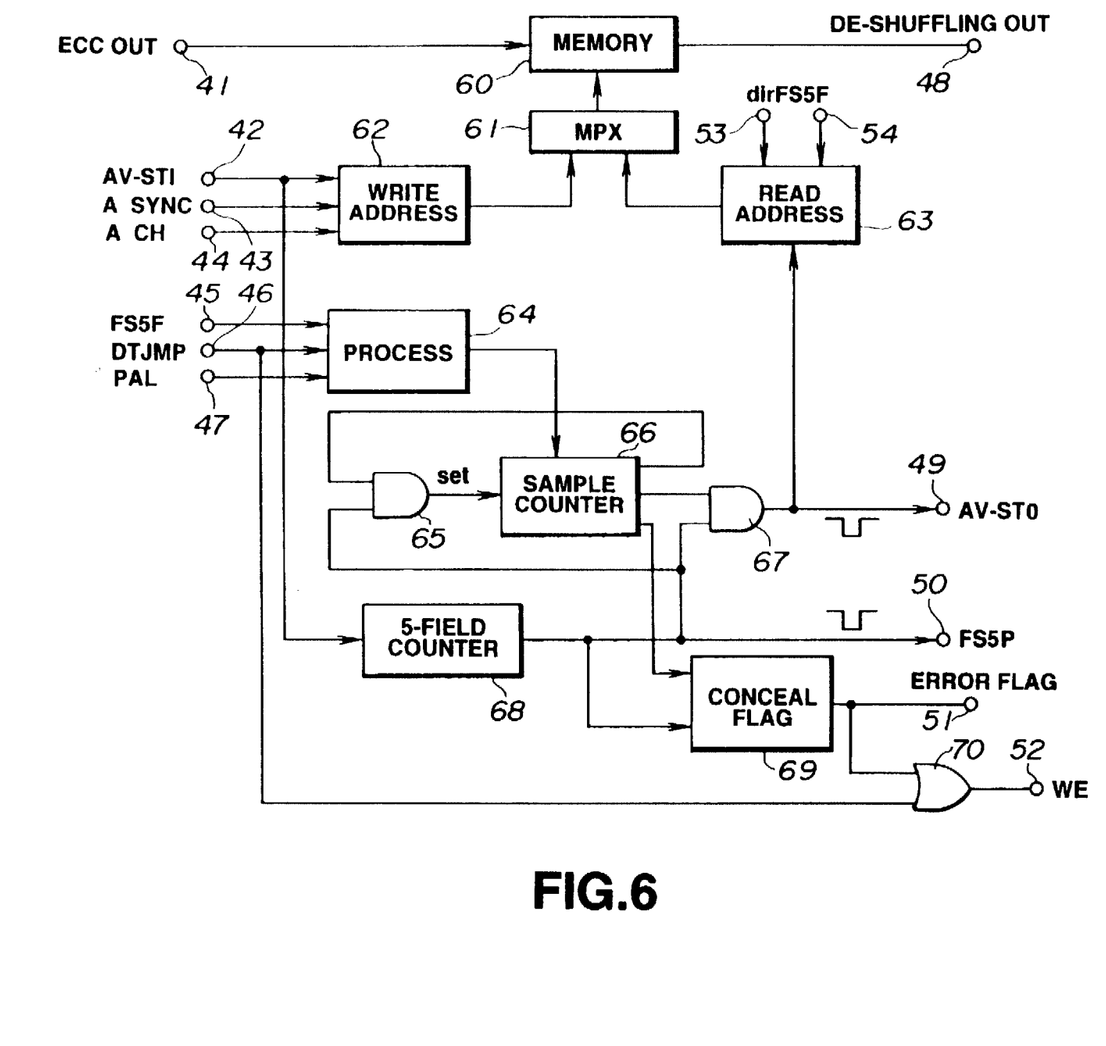
FIG. 6 is a block circuit diagram showing a specific structure of a de-shuffling block in the first audio processor.

FIG. 6 shows a specific example of the structure of the de-shuffling circuit 34. The de-shuffling circuit 34 has a memory 60 capable of storing the effective samples of at least the above-mentioned field, and a read address generating circuit 63 for controlling reading from the memory 60. In the variable speed reproduction with a reproduction speed lower than the normal speed, the read address generating circuit 63 controls the reading from the memory 60 to read out all the effective samples of at least the first reproduction of two or more reproductions and to adaptively delete samples of the remaining reproductions.

In addition, when controlling the number of samples in the variable speed reproduction as described above causes the number of samples corresponding to N fields (for example 5 fields) in the variable speed reproduction to be smaller than M (for example 4004), that is, when the 5-field sequence cannot be maintained, a predetermined flag corresponding to the deficit samples to complete the M samples (for example 4004 samples) is to be outputted.

In the de-shuffling circuit 34 shown in FIG. 6, the ECC block based data (referred to as ECC OUT in FIG. 6) from the clock rate converting circuit 33 is supplied to a terminal 41, and the data is then supplied to the memory 60.

In the de-shuffling circuit 34, the ECC block based data are rearranged to be de-shuffled by controlling the write address and the read address of the memory 60. Stated differently, when data are to be written into the memory 60, the read address is controlled to de-shuffle the data and then the data are sequentially read out. Also, when the data are to be sequentially written and then read out, the read address is controlled to rearrange the data. Thus, the above-described de-shuffling is realized. In the present embodiment, the de-shuffling is performed by employing the latter method.

For this reason, a write address generating circuit 62 sequentially generates write addresses containing data to the memory 60, synchronously with the data (ECC OUT) supplied to the terminal 41, by using an AV-STI signal indicating the initial part of a field and supplied through a terminal 42, an ASYNC signal indicating the initial part of one ECC block and supplied through a terminal 43, and an ACH signal expressing four channels of the ASYNC signal as one unit and supplied through a terminal 44. As the audio signal has four channels, the ACH signal is formed to express the four channels of the ASYNC signal as one unit.

The read address generating circuit 63 generates a read address for de-shuffling the ECC block based data to the memory 60. In the NTSC system, as data of one field including AUX data has 810 words, the read address generating circuit 63 generates a read address for rearranging the data of 801 or 800 samples of the 810 words stored in the memory 60, synchronously with the sampling frequency (48 kHz). Since the audio signal has the sequence of 5 fields as described above, the signal of 4004 samples (=800×1+801×4) are actually processed. In the read address generating circuit 63, generation of the read address for the 800 samples or generation of the read address for the 800 samples is switched on the basis of an FS5F signal indicating that the field of the audio signal supplied through a terminal 54 has 800 samples. In the PAL system, as the data of one field including the AUX data has 972 words, with one word consisting of 24 bits, the data of 960 samples of the 972 words are rearranged synchronously with the sampling frequency.

Rotation direction information indicating whether the variable speed reproduction is carried out forward or backward is supplied to a terminal 53. The read address generating circuit 63 also generates a read address based upon the rotation direction information.

The write address from the write address generating circuit 62 and the read address from the read address generating circuit 63 are transmitted to the memory 60 through a multiplexer 61.

The data de-shuffled and read out from the memory 60 is outputted through a terminal 48. The de-shuffled output is transmitted to the error adjusting circuit 35.

An AV-STO signal indicating the start of de-shuffling in the read address generating circuit 63 is formed to have the following structure.

To a process circuit 64, the FS5F signal through a terminal 45 indicating that the number of effective samples of the input data is 800 and the jump signal DTJMP through a terminal 46 indicating that the dynamic tracking head 2A in the reproducing section 2 has traced the same track are supplied. The process circuit 64 determines that the input through the terminal 41 is an NTSC system signal when an input through a terminal 47 is not a signal indicating a PAL system signal. On determination that the input is the NTSC system signal and that the number of effective samples is 800 on the basis of the FS5P signal, the process circuit 64 outputs to a subsequent sample counter 66 a flag indicating that the field, that is, the AV-STI signal, has the effective audio signal 800 samples. Otherwise, the process circuit 64 outputs a flag indicating that the field has the effective audio signal of 801 samples. For instance, when the FS5F signal reaches an "H" level while the AV-STI signal is at an "L" level, the process circuit 64 outputs the flag indicating that the field, that is, the AV-STI signal, has the effective audio signal of 800 samples. Otherwise, the process circuit 64 outputs the flag indicating that the field has the effective audio signal of 801 samples.

The flag indicating the 800 samples or 800 samples outputted from the process circuit 64 is transmitted to the sample counter 66. The sample counter 66 presets the number of samples contained in the next field based upon the flag indicating that the number of effective samples in the field determined by the process circuit 64 is 800 or 801, thus actuating its self-counter. For example, the sample counter 66 counts 800 sampling clocks FS (48 kHz) when the flag is at the "H" level, and it counts 800 sampling clocks FS when the flag is at the "L" level. A pulse indicating 800 or 801 samples counted by the sample counter 66, that is, a sound breaking pulse, is transmitted as a sound field pulse to one input terminal of a subsequent AND gate 67.

A 5-field counter 68 constantly counts 4004 samples based upon the AV-STI signal in order to maintain the audio 5-field sequence. An FS5P signal indicating break point for every 4004 samples outputted from the 5-field counter 68 is transmitted to the other input terminal of the AND gate 67 and to one input terminal of an AND gate 65. The FS5P signal is also outputted through a terminal 50 to the external circuit.

A pulse indicating the break point of the field of the sample counter 66 is supplied to the other input terminal of the AND gate 65. The AND output, outputted from the output terminal of the AND gate 65, of the pulse for every 5 fields from the 5-field counter 68 and the pulse for every field from the sample counter 66 is transmitted to the sample counter 66 as a reset signal for the sample counter 66.

The AND output of the pulse indicating the break point of the audio field generated by the sample counter 66 and the pulse for every 5 fields from the 5-field counter 68 is transmitted from the AND gate 67 to the read address generating circuit 63, as the AV-STO signal denoting the start of de-shuffling the field of 800 or 801 samples. The AV-STO signal is also transmitted through a terminal 49 to the external circuit.

As described above, in the de-shuffling circuit 34 in the present embodiment, the FS5P signal indicating the break point for every 4004 samples is outputted, and the AV-STI signal performs synchronization, while the AV-STO signal as the de-shuffling start pulse controls the read address generating circuit 63 so that the audio signal is de-shuffled on the basis of the AV-STO signal. Specifically, when the FS5P signal reaches the "H" level while the AV-STI signal is at the "L" level, it is indicated that the field for the AV-STI has the effective audio signal of 800 samples. Therefore, the de-shuffling circuit 34 de-shuffles the data in response to the 800 samples. Otherwise, the de-shuffling circuit 34 de-shuffles the data in response to the 801 samples.

Meanwhile, the 5-field sequence is not broken out in the above-described operation in the normal reproduction mode with the normal reproduction speed. However, in the variable speed reproduction mode or so-called jog mode with the reproduction speed lower than the normal speed, that is, in the mode for tracing the same track twice or more, tracing the track of 801 samples five times results in the total number of sample for 5 fields equal to 4005. In this case, maintaining the 5-field sequence by deleting the last one sample causes the above-described problem.

Figure 7:
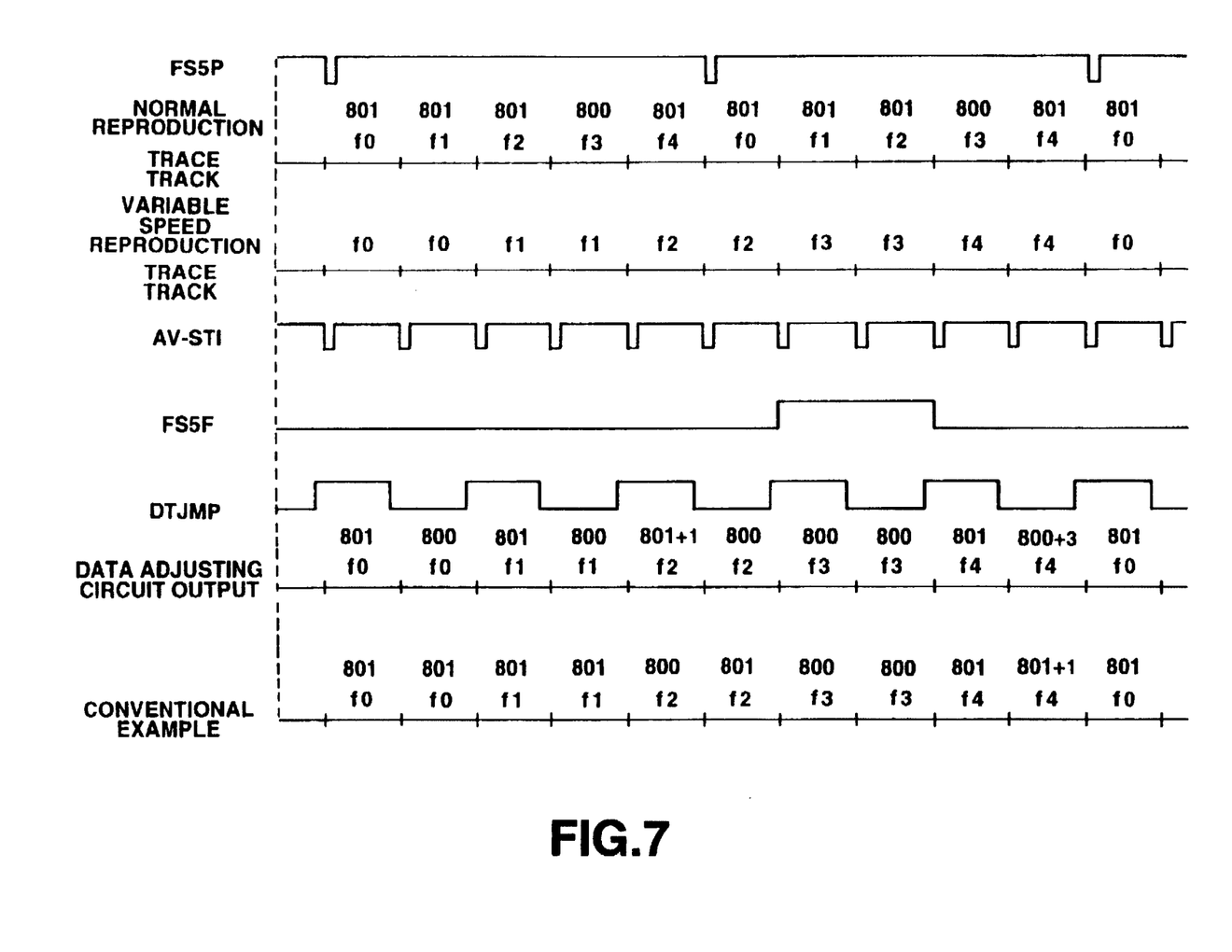
FIG. 7 is a timing chart showing the operation of the reproducing system of the digital VTR according to the present invention.
Figure 8:
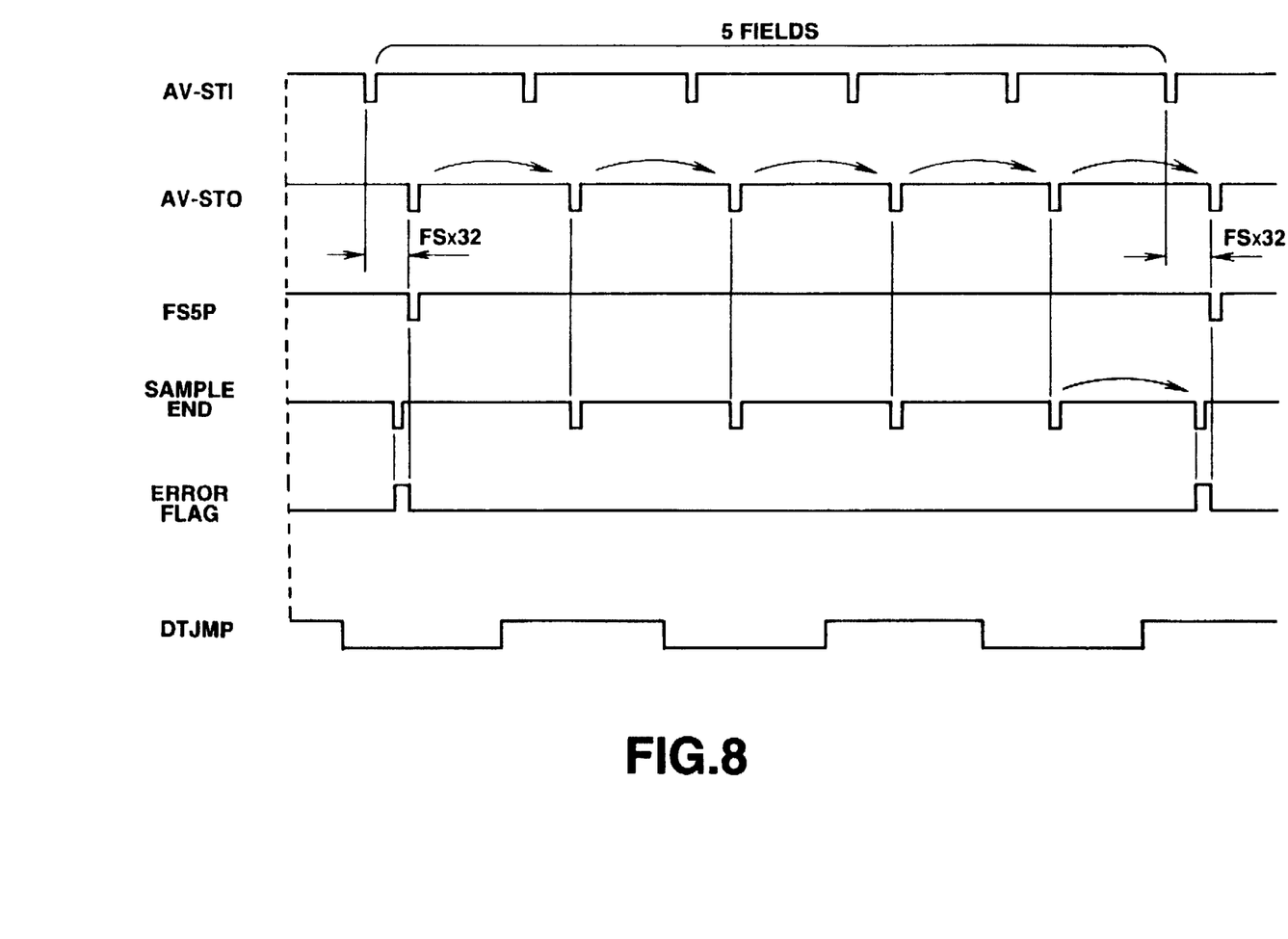
FIG. 8 is a timing chart for explaining the state of error flag generation in a variable speed reproduction mode of the reproducing system of the digital VTR according to the present invention.

For this reason, in the de-shuffling circuit 34 in the present embodiment, when the same track is traced twice or more in the variable speed reproduction mode with the reproduction speed lower than the normal speed, the jump signal DTJMP is raised to the "H" level, as shown in FIGS. 7 and 8, thus avoiding missing of data at the time when data of a new field in the FS5P signal is treated. As the effective sample data required as the de-shuffled data is always data of a new field, samples of the unnecessary sample data of the second and subsequent tracing in the case of tracing the same track twice or more are adaptively deleted, so as to maintain the 5-field sequence.

Stated differently, by outputting all the effective samples of at least one reproduction of two or more reproductions of an arbitrary track in the variable speed reproduction for tracing the arbitrary track twice or more, the adverse effect of deleting the effective sample is prevented. Also, the number of samples of the remaining reproduction of the same track is adaptively controlled by controlling the read address in de-shuffling. Thus, the number of samples in the 5-field sequence in the variable speed reproduction is limited not to exceed 4004. Specifically, in the present embodiment, the read address of the memory 60 is controlled so as to delete one sample or not to read the final sample in the second and subsequent reproductions when the same field of 801 samples is reproduced twice or more, as shown in FIG. 7.

As described above, however, deleting one sample in the second and subsequent reproductions of the field of 801 samples may cause the number of samples for 5 fields to be less than 4004. In the present embodiment, adaptive deletion of samples is employed in which a conceal flag generating circuit 69 generates an error flag when the 5-field sequence has samples less than 4004, so that the subsequent error adjusting circuit 35 interpolates data based upon the error flag.

The conceal flag generating circuit 69 generates the error flag based upon the pulse indicating the break point from the sample counter 66 and the pulse for every 5 fields from the 5-field counter 68. For instance, when the sample end of the 5 fields corresponding to the pulse indicating the break point of the field from the sample counter 66 is generated before the pulse for every 5 fields from the 5-field counter 68, the conceal flag generating circuit 69 determines that the 5-field sequence has samples less than 4004 and thus generates the error flag corresponding to the difference between the sample end and the pulse for every 5 fields, that is, the error flag corresponding to the deficit samples to complete 4004 samples. The error flag is transmitted through a terminal 51 to the error adjusting circuit 35. The error flag is a signal which is normally at the "L" level and reaches the "H" level in response to the number of deficit samples when the number of samples is less than 4004.

The error adjusting circuit 35, provided with the error flag through the terminal 51, interpolates the data of the 5-field sequence having samples less than 4004, with a pre-holding or the like.

The jump signal DTJMP from the terminal 46 is also supplied to the other input terminal of an OR gate 70 having one input terminal supplied with the output from the conceal flag generating circuit 69. An output from the OR gate 70 is outputted as a write enable signal WE for the memory 60. With the write enable signal WE outputted, the data is entered to the memory 60 when data of a new field is treated in the FS5P signal, even in tracing the same track twice or more in the variable speed reproduction with the reproduction speed lower than the normal speed, so that the data is not missed.

In the present embodiment, by the above-described operation, the output from the error adjusting circuit 35 can maintain the 5-field sequence as shown in FIG. 7, even in the variable speed reproduction with the reproduction speed lower than the normal speed. In comparison, samples of each field of the conventional example in which the samples exceeding 4004 samples are deleted are also shown in FIG. 7.

In FIG. 8, the output of the AV-STI signal through the AV-STO signal requires a delay of 32 sampling blocks FS, which represents the time required for storing data in the memory 60 from writing of input data until the de-shuffling. That is, the delay of 32×FS is provided in consideration of the margin for writing in/readout from the memory 60, the capacity of the memory 60 and the safety of the system.

The embodiment of the present invention is effective when audio data recorded on the tape cannot be directly outputted in the AES/EBU format in the signal processing of the NTSC system, particularly in the variable speed reproduction. In the present embodiment, it is assumed that the variable speed audio reproduction is performed after the above processing. Even though the variable speed audio reproduction is not performed, the error flag processing is performed to maintain the sequential signal by outputting in the AES/EBU format.

In the present embodiment, as is described above, when data of 5 fields each consisting of 801 samples are consecutively reproduced, that is, when the track having 801 effective samples is traced 5 times, the track is processed in relation to the previous field instead of simply deleting one sample in an arbitrary field to maintain the 5-field sequence. Thus, satisfactory reproduction sounds which are not adversely affected can be provided.

I claim:

1. A digital information signal reproducing apparatus for reproducing digital signals from helical tracks on a recording medium, the digital signals comprising a plurality of fields of data wherein each field includes a respective number of data samples, the apparatus having a normal speed reproduction mode and a slow speed reproduction mode and including a dynamic tracking head, said apparatus comprising:

reproducing means for repeatedly reproducing at least one of said plurality of fields of data in said slow speed reproduction mode, said reproducing means including servo means operable to shift said dynamic tracking head in a direction vertical to said helical tracks and to output a jump signal indicating a control state;

processing means, coupled to said reproducing means, for processing each of the data samples produced from a reproduction of a field of data and for processing less than all of the data samples produced from a subsequent reproduction of one of said plurality of fields of data, said processing means including (1) de-shuffling means for de-shuffling data samples from a reproduced field of data, said de-shuffling means having memory means for storing a reproduced field of data, and address means, coupled to said memory means, for performing said de-shuffling and for outputting selected data samples, and (2) flag output means for detecting, per every N fields, the total number of data samples read out from said memory means and outputting an error flag when the total number of data samples read out is less than M, the total number of samples read out from said memory means being controlled by said processing means in response to said jump signal; and concealing means for adding extra samples of data when less than M samples of data are produced from a set of N reproductions of fields of data;

wherein N is an aliquant part of M, and N and M are natural numbers.

2. Apparatus according to claim 1, wherein said subsequent reproduction of one of said plurality of fields of data comprises another reproduction of said field of data.

3. Apparatus according to claim 1, wherein said subsequent reproduction of one of said plurality of fields of data comprises a reproduction of another field of data.

4. Apparatus according to claim 1, wherein M equals 4004 and wherein N equals 5.

5. Apparatus according to claim 1, wherein said concealing means produces the extra samples of data by interpolation.

6. Apparatus according to claim 1, wherein said de-shuffling means comprises:

a first sample counter for counting a number of data samples produced from each reproduction of each field of data; and a second sample counter for counting another number of data samples produced from a set of N successive reproductions of fields of data.

7. Apparatus according to claim 1, wherein said plurality of fields of data comprise fields of audio/video data and wherein the data samples comprise audio data samples.

* * * * *